US008010807B2

(12) United States Patent
Chrisop et al.

(10) Patent No.: US 8,010,807 B2
(45) Date of Patent: Aug. 30, 2011

(54) RANDOM BIT MASK GENERATION FOR OBSCURING DATA ON NONVOLATILE MEMORY DEVICE

(75) Inventors: Roy Chrisop, Camas, WA (US); Jack Van Oosterhout, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1109 days.

(21) Appl. No.: 11/227,414

(22) Filed: Sep. 14, 2005

(65) Prior Publication Data

US 2006/0015756 A1    Jan. 19, 2006

Related U.S. Application Data

(63) Continuation of application No. 09/795,407, filed on Feb. 28, 2001, now abandoned.

(60) Provisional application No. 60/192,194, filed on Mar. 27, 2000.

(51) Int. Cl.
*G06F 11/30* (2006.01)
*G06F 12/14* (2006.01)
*G06Q 20/00* (2006.01)

(52) U.S. Cl. ............ 713/193; 713/194; 705/64; 705/75

(58) Field of Classification Search .............. 705/64, 705/75; 713/193, 194
See application file for complete search history.

(56) References Cited

U.S. PATENT DOCUMENTS

| | | | |
|---|---|---|---|
| 4,860,115 A | 8/1989 | Ogura | |
| 4,960,982 A | 10/1990 | Takahira | |
| 4,974,167 A * | 11/1990 | Anderson et al. | ............... 702/68 |
| 5,105,284 A | 4/1992 | Sakata et al. | |
| 5,193,184 A | 3/1993 | Belsan et al. | |
| 5,206,905 A | 4/1993 | Lee et al. | |
| 5,212,729 A | 5/1993 | Schaefer | |
| 5,220,438 A | 6/1993 | Yamamoto | |
| 5,258,853 A | 11/1993 | Nobuta et al. | |
| 5,265,230 A | 11/1993 | Saldanha et al. | |
| 5,282,247 A | 1/1994 | McLean et al. | |
| 5,343,525 A | 8/1994 | Hung et al. | |
| 5,521,716 A | 5/1996 | Itoh | |
| 5,592,612 A | 1/1997 | Birk | |
| 5,642,199 A * | 6/1997 | Ukai et al. | ............... 358/296 |
| 5,666,211 A | 9/1997 | Tahara et al. | |
| 5,751,346 A | 5/1998 | Dozier et al. | |
| 5,855,018 A | 12/1998 | Chor et al. | |
| 5,901,278 A | 5/1999 | Kurihara et al. | |
| 5,923,841 A | 7/1999 | Lee | |
| 5,935,244 A | 8/1999 | Swamy et al. | |

(Continued)

OTHER PUBLICATIONS

PowerQuest Corporation, DataGone for permanent data removal, web site printout, http://www.powerquest.com/datagone/, at least as early as Feb. 12, 2001.

(Continued)

*Primary Examiner* — Shin-Hon Chen
(74) *Attorney, Agent, or Firm* — Michael Blaine Brooks, PC; Michael B. Brooks; David Ripma

(57) ABSTRACT

A method and apparatus for preventing unauthorized access to information temporarily stored in memory, such as a hard disk drive, associated with a digital document processor, such as a digital copier, printer, or facsimile machine. This invention includes storing information to memory, conducting an operation on the information, and automatically overwriting the information one or more times with a bit mask. Bit masks may be non-random or random sequences of binary values.

26 Claims, 6 Drawing Sheets

U.S. PATENT DOCUMENTS

| | | | |
|---|---|---|---|
| 5,969,933 | A | 10/1999 | Schultz et al. |
| 6,012,145 | A * | 1/2000 | Mathers et al. .................. 726/17 |
| 6,055,067 | A | 4/2000 | Matsuda et al. |
| 6,057,940 | A | 5/2000 | Kawamoto |
| 6,061,150 | A | 5/2000 | Yamamoto |
| 6,075,721 | A * | 6/2000 | Runaldue et al. .............. 365/154 |
| 6,681,214 | B1 * | 1/2004 | Doljack ........................... 705/75 |
| 6,952,831 | B1 | 10/2005 | Moore |

OTHER PUBLICATIONS

PowerQuest Corporation, White Paper, DataGone Permanent Data Removal, at least as early as Dec. 31, 2000.

PowerQuest Corporation, DataGone 2.4 User Guide, Manual Edition 1, at least as early as Aug. 2000.

Windmill Software Ltd, Windows Engineering Software, web site printout, Issue 20:Data Logging Tips,http://www.windmill.co.uk/monitor20.html,at least as early as Feb. 12, 2001.

WhiteCanyon Inc., web site printout, http://www.whitecanyon.com/index.html,at least as early as Dec. 31, 2000.

WhiteCanyon Inc., SecureClean, web site printout, http://www.whitecanyon.com/secureclean_main_erase_hard_drive.htm, at least as early as Feb. 12, 2001.

WhiteCanyon Inc., CleanDrive, web site printout, http://www.whitecanyon.com/cleandrive_main_fdisk.htm, at least as early as Feb. 12, 2001.

WhiteCanyon Inc., CleanDrive screenshots, web site printout, http://www.whitecanyon.com/cleandrive_screenshots_fdisk.htm, at least as early as Feb. 12, 2001.

* cited by examiner

RANDOM BIT MASK GENERATION FOR OBSCURING DATA ON NONVOLATILE MEMORY DEVICE

CROSS REFERENCE TO RELATED APPLICATION

This application is a continuation of U.S. Nonprovisional Utility patent application Ser. No. 09/795,407, filed Feb. 28, 2001, which claims the benefit and incorporates by reference U.S. Provisional Patent Application Ser. No. 60/192,194, filed Mar. 27, 2000.

BACKGROUND OF THE INVENTION

The present invention relates generally to a method and apparatus for safeguarding data stored in memory and specifically to a method to prevent unauthorized access to data stored temporarily in a nonvolatile memory, such as a hard disk drive.

Digital copiers, laser printers, facsimile machines, document scanners, computers, cellular telephones, digital cameras, and multifunction devices possess several properties in common. All these devices are capable of processing a digital image of a document ("image," "data," "image data," or "image data file"). If the device is able to "read" a document, it typically includes a scanner component, and if the device is able to print a document, it typically includes a printer component. Additionally, these devices typically incorporate a memory. These devices may be collectively referred to as "digital document processors."

Digital document processors may perform one or more of the following operations: scanning, storing, transmitting, reading, viewing, printing, and deleting. Depending on the particular digital document processor, additional operations may also be performed.

A digital document processor may be able to perform the operation of scanning an original document. The document is illuminated and a charge coupled device or a contact image sensor converts the reflected image into a plurality of electrical signals that together create a digital image of the original document. All or part of the scanned image data is typically stored in a memory.

A digital document processor may be able to perform the operation of printing image data stored in a memory. One type of printing, laser printing, may be accomplished by reading image data from memory in another digital document processor (such as a computer) and using the data to turn a laser beam on and off as the beam scans a charged drum. Where the laser beam strikes the drum, charges are neutralized. Areas not exposed to the beam attract toner powder which is transferred to paper passing over the drum. Pressure applied to the paper as it passes over the drum fuses the toner powder to the paper. The image data stored in memory is thus converted to a physical representation on paper. The image data may also be read from the digital document processor's memory. For example, to accommodate the slower speed of a printer without idling a computer's faster input/output bus, image data in computer memory may be buffered in a printer memory. In addition, confidential or secure image data may be stored in a digital document processor's memory and not printed until an authorized user enters a personal identification number. In this way, a user may send a confidential document to a printer and the document will not print until the user is present.

A digital document processor may be able to perform the operation of copying an original document. By storing image data to memory, multiple copies can be made without repeatedly inputting an original document. In addition, storing image data to memory permits image size, orientation, and page sequence to be modified prior to printing. For example, two original 8½" by 11" images stored in memory may be rotated 90 degrees, reduced in size, and printed side-by-side on one side of a single 8½" by 11" sheet of paper. As a further example, a large number of original images may be reduced, reoriented, and printed side-by-side on the front and back sides of sheets of paper in a sequence different from the copy sequence in book format.

As exemplified by the scanning, printing, and copying operations, most operations use memory at one or more steps. A transmitting operation, for example, stores image data in a facsimile memory so that an image can be transmitted later or so that images can be simultaneously transmitted and received. In addition, memory is used in digital document processors for other purposes readily apparent to one skilled in the art.

A document may be represented in memory as a bit-mapped image. A bit map is a representation of an original document that consists of rows and columns of dots. The value of each dot may be stored in memory as a single bit to represent a black or white value, or as a byte or several bytes for shades of gray or for colors. Documents may be stored using other storage schemes, but they are all based on a binary code that uses ones ("positives") or zeros ("negatives"). Throughout this document, storage schemes may be discussed in terms of bit mapping, but one skilled in the art could apply the same principles to other storage schemes.

Memory may include both volatile memory and nonvolatile memory. "Nonvolatile memory" means any memory having the property of retaining stored data when electrical power fails or is turned off. Examples of nonvolatile memory include hard disks, floppy disks, optical disks, compact disks ("CDs"), digital versatile disks ("DVDs"), tape drives, and various integrated circuit ("IC") memories, as further defined below.

Nonvolatile memory devices, such as floppy disks, hard disks, magnetic tape, optical disks, CDs, and DVDs, are made from media that can be permanently altered to store a bit of information. In the case of floppy disks, hard disks, and magnetic tape, data is stored by writing a pattern of magnetic fields on a magnetic material. Data is read by sensing the presence of a magnetic field and its direction. In the case of optical disks, CDs, and DVDs, a laser is used to form and read bumps on a plastic media.

IC devices such as erasable programmable read-only memory ("EPROM"), electrically erasable programmable read-only memory ("EEPROM"), flash erasable programmable read-only memory, nonvolatile random access memory ("NVRAM"), and flash memory chips represent another type of nonvolatile memory. In these devices, data is represented by electric charges stored on insulated gates. Another type of IC nonvolatile memory is a static random access memory with a battery backup.

With disk type nonvolatile memory, a portion of each disk may store a directory for the disk. To locate a particular data file, the directory is used to identify the location where the data is stored. The directory is also used to identify "free" locations where new data may be stored. In addition, before a disk can be used it may require formatting to define locations where data may be stored. When a user issues a command to format a disk containing previously stored data, only the directory is updated to indicate locations where data may be stored. Similarly, when a user issues a command to delete a file stored on a disk, only the directory is updated. Alternatively, data on a disk may be stored and retrieved using a linked list data structure instead of a table. When a user issues a delete command, only a pointer to the data is updated. In all three situations, however, data remains on the disk until it is later overwritten.

Even when image data is overwritten with new information, a substantial portion or residual elements of the overwritten information may remain on the disk. First, modern disks commonly use data compression and multibit coding techniques. With these techniques, overwriting all zeros, for example, results in writing a single zero and a follow-on code indicating the length of the run. These techniques may result in substantial portions of the original information remaining on the disk. Second, the pattern of magnetization on a disk is modified when image data is stored. Traces of the modified pattern of magnetization remain even after it is overwritten. Sophisticated techniques have been developed that sense subtle changes in magnetization and enable the overwritten information to be recovered from residual elements.

A disadvantage of nonvolatile memory or storage devices is that the stored data may be viewed by unauthorized persons. Because nonvolatile memory retains stored data when electrical power fails or is turned off, it is possible to remove a nonvolatile memory device from a digital document processor, install the memory in a computing system, and use the computing system to read data stored in the nonvolatile memory. A further disadvantage of nonvolatile storage devices is that even when data has been "erased," it may still be possible to recover and read the information. Data may be recovered and read because only a directory entry or a pointer to the data was erased, because data compression or multibit coding techniques do not overwrite a substantial portion of the data, or because sophisticated techniques may be used to detect residual elements of a magnetic pattern remain on the disk even after an overwrite.

The security risk associated with memory being readable after it is removed from a digital document processor has been recognized, and security solutions for protecting the confidentiality of data stored in memory have been attempted.

Some types of security solutions erase the entire memory. For example, degaussing may be used to neutralize or demagnetize an entire magnetic memory. Physical destruction may be used to prevent access to an entire optical memory. The entire memory of an IC device, such as an EPROM, may be erased by shining an ultraviolet light through a quartz window in the top of the package. In other ICs, such as an EEPROM, the entire memory may be electrically erased by downloading a bit sequence to the device.

Because data is generally recoverable if it is merely "deleted" or "erased" by a software program, the overwriting security solution was developed to obscure or conceal the data. When information is identified as sensitive or a security risk, a specific overwriting instruction is made. Alternatively, data may kept for a predefined period until the memory is needed again and then overwritten.

Overwriting refers to storing new useful data or a meaningless bit pattern at the memory location of the data to be erased. When overwriting is used to conceal information, the overwritten bit pattern may be all ones, all zeros, or any predetermined sequence of binary values. Alternately, the bit pattern may be a random or pseudo-random pattern of binary values ("random bit mask"). A pseudo-random number sequence is so named because an identical sequence of numbers is created each time the generator is invoked, and the sequence eventually repeats. An advantage of overwriting with a random bit mask is that the ability of sophisticated techniques to reconstruct the original data from residual elements is significantly diminished.

Several government agencies have established standards for overwriting data stored on a hard disk drive. Typically, these standards require two or more overwrite operations. The Department of Defense, for example, requires three overwrites: (1) a binary value is written, (2) a complementary binary value is written, and (3) a random value is written.

PowerQuest's DATAGONE™ is a commercially available software program that erases data from a hard disk using overwriting operations. DATAGONE™ erases an entire partition of a hard drive. White Canyon Software's SECURECLEAN™ is another software program that erases data from a hard disk by performing overwrite operations at the file level.

Windmill Software Ltd.'s Windmill Logger is a data acquisition software program that exemplifies the use of an overwriting operation to conserve space on a hard disk drive. To prevent a user's hard disk drive from being filled with data, the user may specify a set of data files that may be reused. For example, seven data files, one for each day of the week, may be specified. When all seven specified files are full, data in the first file is automatically overwritten with new data. On the next day, the second data file is over-written, etc.

U.S. Pat. No. 6,012,145 to Mathers, et al. ("the Mathers reference") discloses another means for securing nonvolatile memory. Specifically, the Mathers reference discloses a password security system for protecting information recorded on the portable hard disk drives that are typically used in laptop portable computers. The Mathers reference requires an additional microprocessor, a keyboard, a display, and an operating system. While the Mathers reference provides a security means for portable hard disk drives, the additional hardware and software required make it expensive and impractical for use with hard disk drives incorporated into digital document processors other than portable laptop computers.

Ukai, et al., U.S. Pat. No. 5,642,199, ("the Ukai reference") discloses a digital copier or a complex copier having a facsimile function with a security function for keeping a record of persons who copied or transmitted images and the dates of copying or transmission. In addition, the type of image may be recorded, or a "thinned" version of the document image may be saved. While the Ukai reference discloses a means for identifying the person who may have had unauthorized access to a document, it does not prevent unauthorized access to a document.

BRIEF SUMMARY OF THE INVENTION

All the known solutions for keeping image data secure are concerned with image data that a user intends to store for a time. Subsequently, a specific request (or a predefined instruction) is made to delete, erase, or overwrite the image data when it is no longer needed.

With the present invention the primary concern is to perform an operation, not to store data. The present invention, therefore, is directed to keeping data secure when data storage is transitory and incidental to an operation, that is, when it is known that the data need only be stored until an operation is complete. There is no intent to store the data. When the operation is complete, the stored image data in memory is no longer needed, but leaving the unneeded image data in memory creates a security risk.

The present invention relates generally to a method for safeguarding data stored in memory and specifically to a method for preventing unauthorized access to data stored temporarily in a nonvolatile memory.

One preferred embodiment of the present invention is a method for concealing information stored in a digital document processor memory, comprising storing information, conducting an operation on the stored information, and automatically overwriting the information with a bit mask.

An alternative preferred embodiment of the present invention safeguards the erased image data against computer access outside the scope of normal operation of a digital document processor by actually erasing the data, not just restricting its access.

An additional preferred embodiment safeguards the erased image data from sophisticated methods that use residual elements that remain on a disk to recover the original data.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
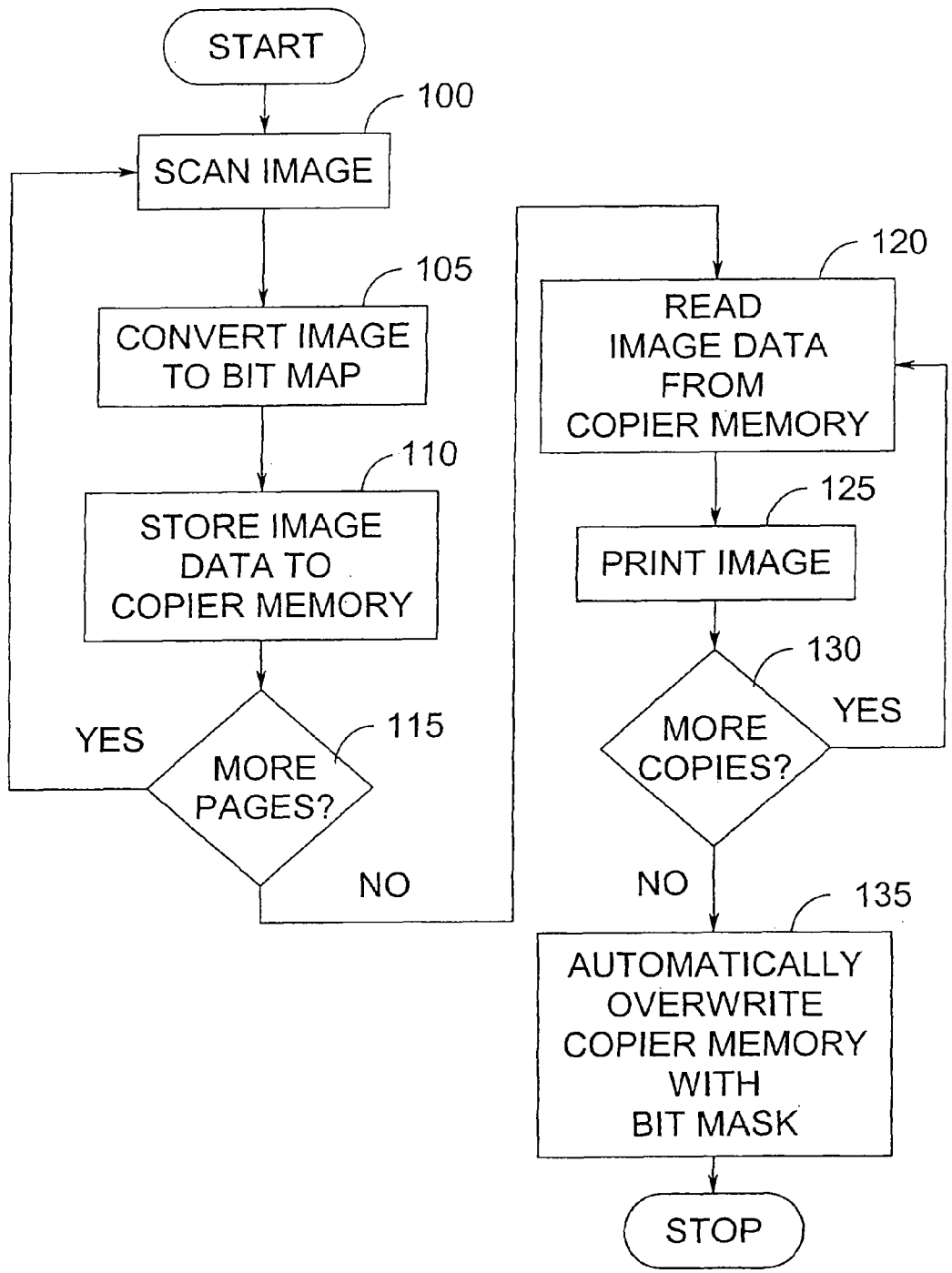
FIG. 1 is a flow diagram of an exemplary embodiment of the present invention, illustrating operation of a digital copier system whose image data, stored temporarily in a nonvolatile copier memory, is automatically overwritten with a bit mask.
Figure 2:
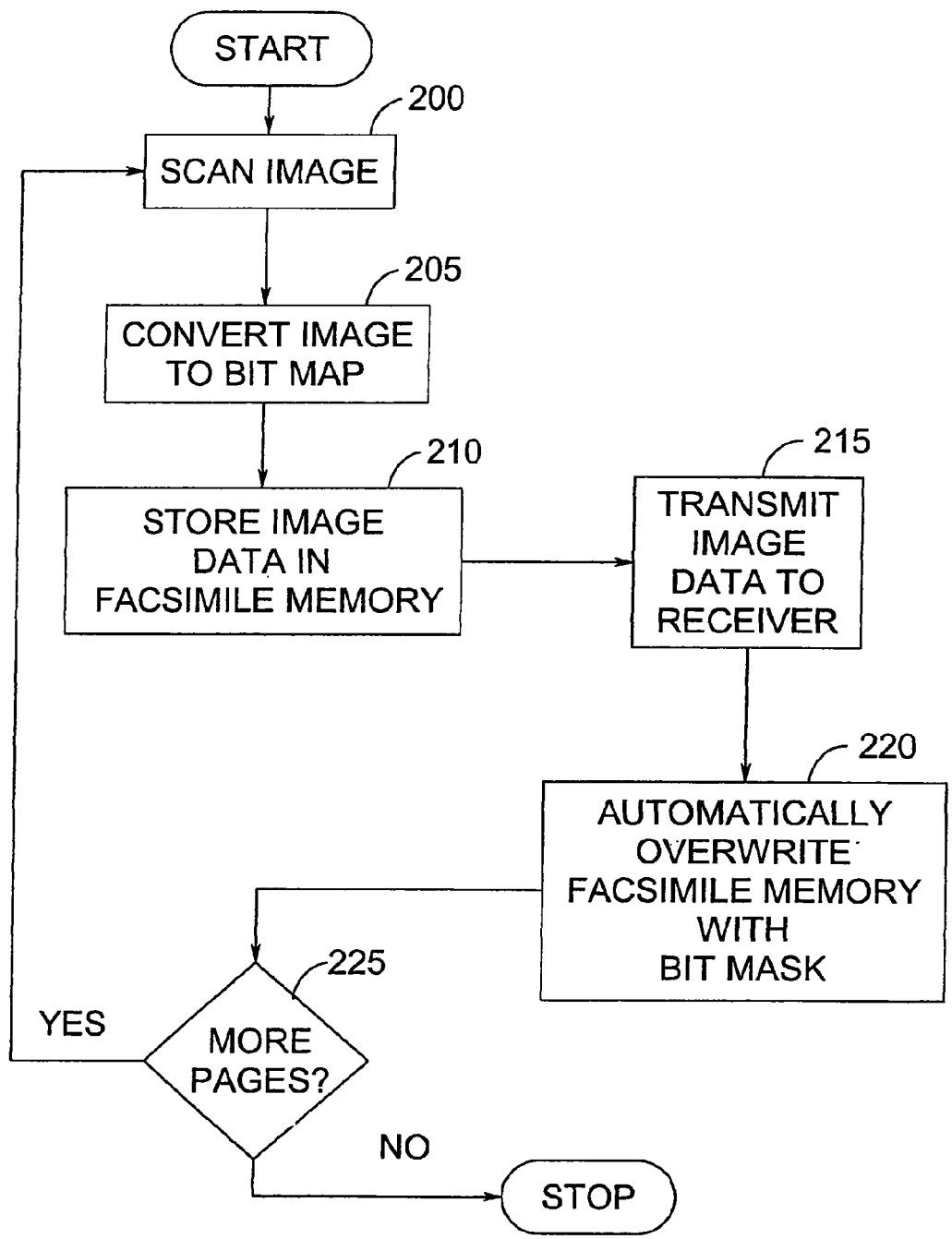
FIG. 2 is a flow diagram of an exemplary embodiment of the present invention, illustrating operation of a facsimile machine whose image data, stored temporarily in a nonvolatile facsimile memory, is automatically overwritten with a bit mask.
Figure 3:
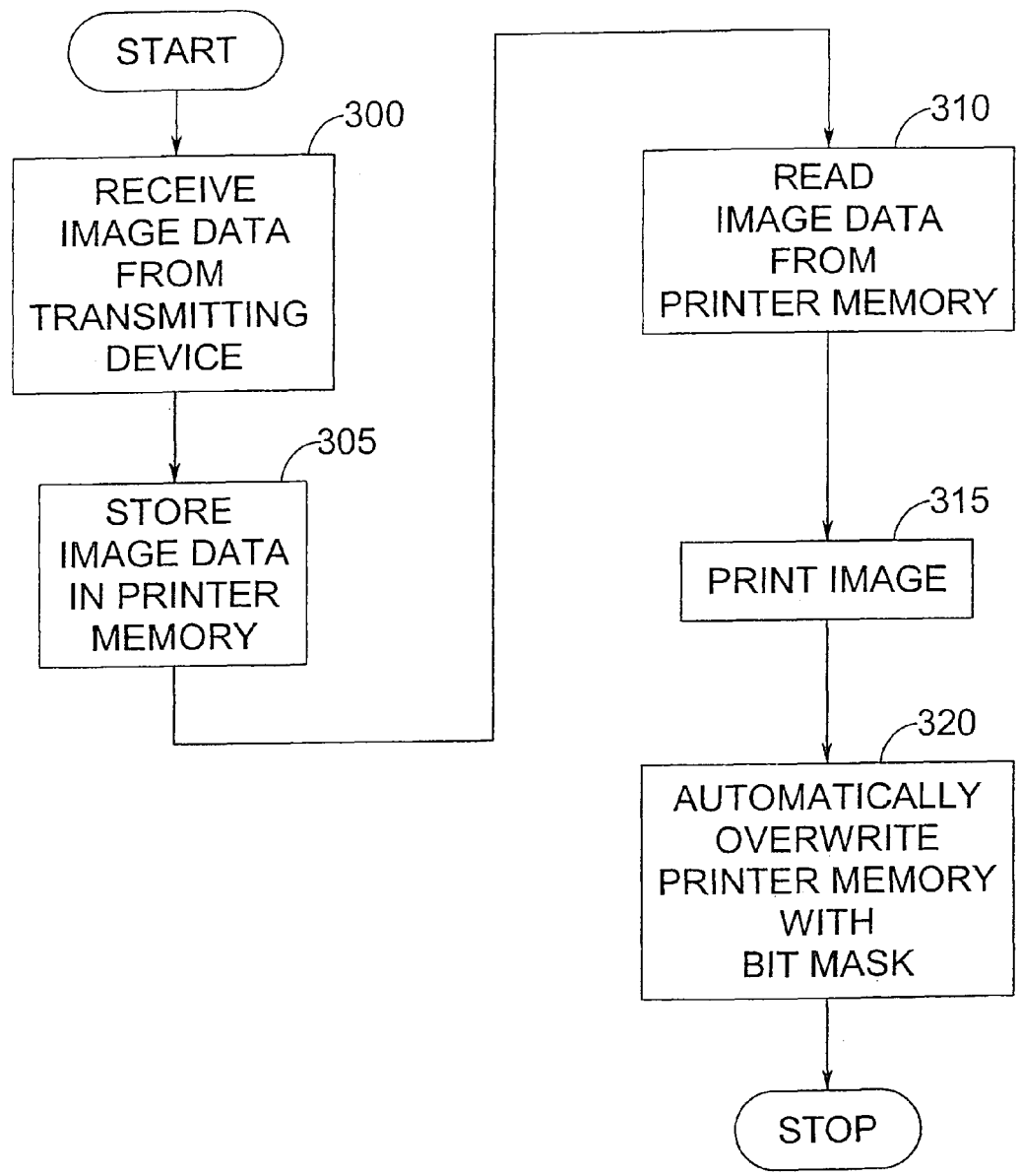
FIG. 3 is a flow diagram of an exemplary embodiment of the present invention, illustrating operation of a printer whose image data, stored temporarily in a nonvolatile printer memory is automatically overwritten with a bit mask.
Figure 4A:
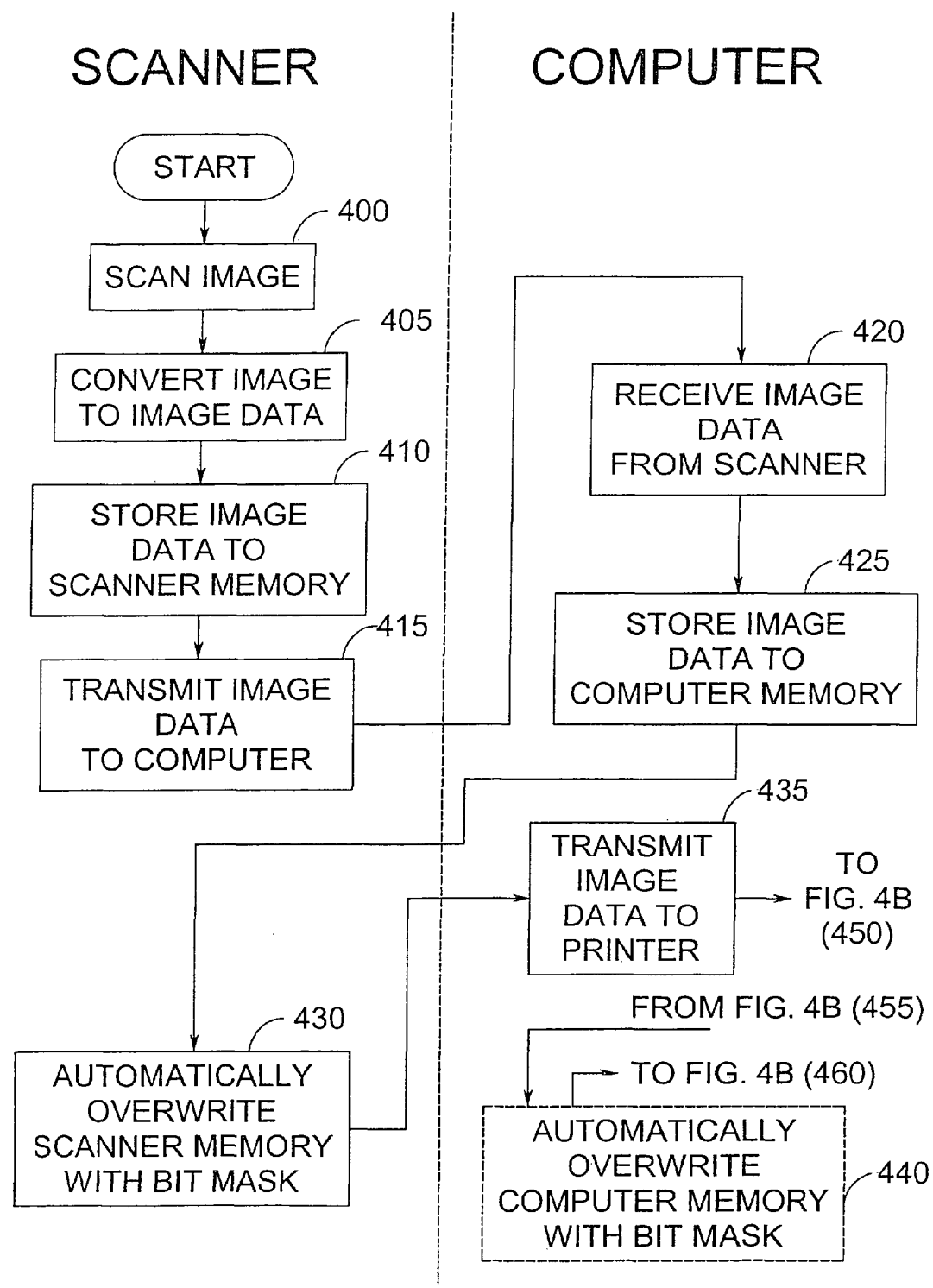
FIGS. 4A, 4B are flow diagrams of an exemplary embodiment of the present invention, illustrating operation of a scanner, a computer system, and a printer whose respective image data, stored temporarily in nonvolatile memories, are automatically overwritten with a bit mask after an operation is completed.
Figure 4B:
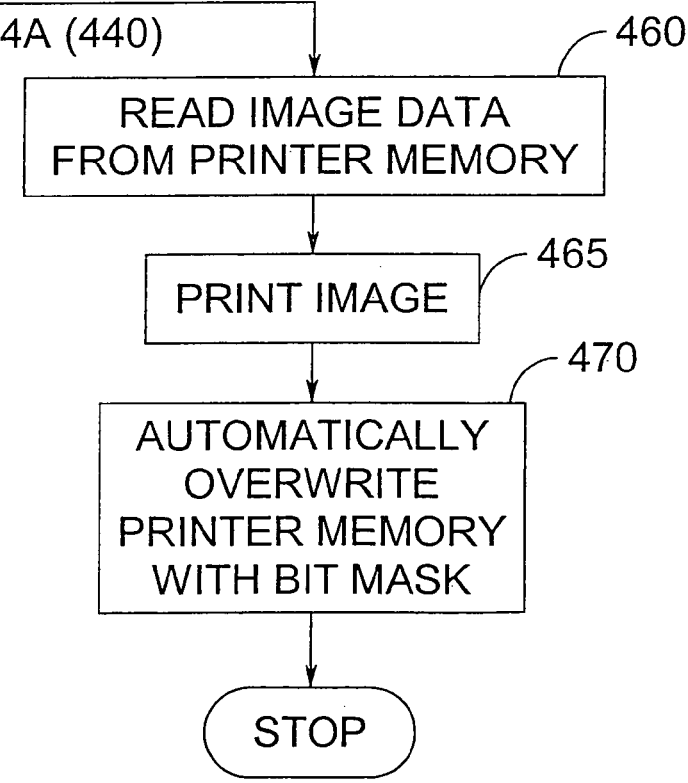
Figure 5:
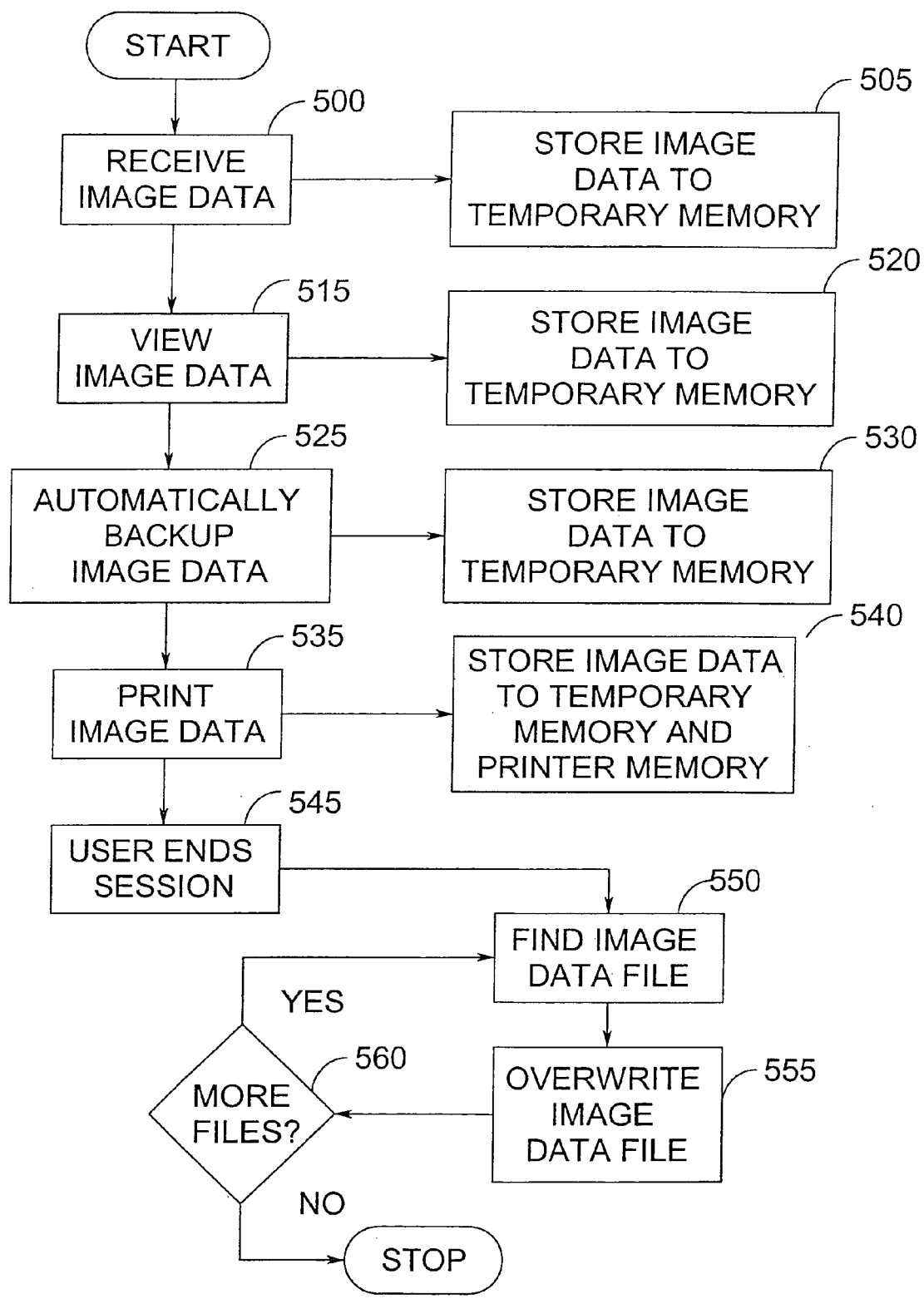
FIG. 5 is a flow diagram of an exemplary embodiment of the present invention, illustrating a method of deleting a plurality of image data files stored in a plurality of nonvolatile memories by automatically overwriting image data in each file with a bit mask.

FIGS. 1-5 are exemplary embodiments of the present invention showing a method for safeguarding data stored temporarily in a nonvolatile memory. FIG. 1 shows the invention as applied to a digital copier. FIG. 2 shows the invention as applied to a facsimile machine. FIG. 3 show the invention as applied to a printer. FIGS. 4A and 4B show the invention as applied to a several digital document processors. FIG. 5 shows the invention as applied to a method for safeguarding data stored temporarily in a plurality of memories. These examples, as will be discussed individually, embody the basic principles of the methods or approaches of the present invention for concealing ("obscuring," "obliterating," "erasing," or "deleting") information stored in at least one memory. Specifically, these examples show storing information to memory, conducting an operation on the information, and automatically overwriting the information by storing a bit mask to the memory.

FIG. 1 shows an exemplary embodiment of the present invention directed to a digital copier system. As shown, an original document is scanned 100, converted to image data 105, and stored in a copier memory 110. The steps are repeated until all pages of the original document have been scanned and stored in memory 115. The image data is read from memory 120 and used to print an image of each page of the original document 125. After the requested number of copies have been printed 130, the image data stored in the copier memory is automatically overwritten with a bit mask 135. It should be noted that this method may be modified, for example, by automatically overwriting after each page is printed.

FIG. 2 shows an exemplary embodiment of the present invention directed to a facsimile machine. As shown, an original document is scanned 200, converted to image data 205, and stored in a facsimile memory 210. The image data is used to transmit an image of the original document to a receiver 215. The receiver may be a facsimile machine, a computer system, a printer, or any other digital document processor capable of receiving facsimile transmissions. The receiver may have receiver memory associated with it. After successful transmission to the receiver, the image data stored in the facsimile memory is automatically overwritten with a bit mask 220. These steps are repeated until all pages of the original document have been scanned and transmitted to the receiver 225. In an alternative preferred embodiment, the facsimile memory is automatically overwritten with a bit mask after all pages are scanned and transmitted. It should be noted that the facsimile machine or other digital document processor that receives the image may include an embodiment of the present invention in which the received image is saved to memory and automatically overwritten after it is printed.

FIG. 3 shows an exemplary embodiment of the present invention directed to a printer. As shown, an image is received from a transmitting device 300 and stored in a printer memory 305. The transmitting device may be a computer system or any other device capable of transmitting image data. The image data is read from the printer memory 310 and used to print an image 315. After the image is successfully printed, the image data stored in the printer memory is automatically overwritten with a bit mask 320. It should be noted that this method may be modified. In a large document, for example, memory may automatically be overwritten as the image data is used to print each page of the image.

FIGS. 4A, 4B show an exemplary embodiment of the present invention as applied to a scanner, computer, and printer. These figures show how the present invention may be used in multiple digital document processors. As shown in FIG. 4A, an original document is scanned 400, converted to image data 405, and stored in a scanner memory 410. The image data is transmitted to the computer 415 where it is received 420 and stored in a computer memory 425, then the scanner's memory is automatically overwritten with a bit mask 430. The image data is transmitted to the printer 435, and, as shown in FIG. 4B, is received 450 and stored in a printer memory 455. In one preferred embodiment, the stored image data in the computer memory is automatically overwritten with a bit mask 440. In an alternative preferred embodiment, the stored image data in the computer memory is not automatically overwritten with a bit mask. The image data is read from the printer memory 460 and used to print an image 465. After the image is successfully printed, the image data stored in the printer memory is automatically overwritten with a bit mask 470.

FIG. 5 shows an exemplary embodiment of the present invention directed to a method of deleting a plurality of temporary image data files stored in a plurality of nonvolatile memories by automatically overwriting the image data in each file with a bit mask when the operation or operations that created the temporary image data files are complete. Temporary image data files are created by digital document processors for many reasons including Internet downloading, viewing, backing-up, printing, and for other reasons readily apparent to one skilled in the art. These temporary files tend to clutter a system and create a security risk.

As shown, a digital document processor receives a document image 500, and stores the image data in a first temporary memory 505. In one preferred embodiment, a computer receives image data via the Internet, and it is stored in a temporary Internet file. A user views the image data on a display or computer screen 515. The viewing operation includes an operation of storing image data 520 in a second temporary memory dedicated to the display. An automatic backup operation is performed 525 wherein image data is stored in a third temporary memory 530. (Automatic backup operations may be performed at short periodic intervals so that if the system loses power before the user requests a save operation, only those changes made by a user to a document since the last automatic save operation will be lost). A user performs a printing operation 535 that includes the operations of storing image data 540 in a fourth temporary memory on the digital document processor and in a printer memory.

As shown in FIG. 5, at the end of a user session (comprising several operations) 545, a search is performed to find an image data file stored in a temporary memory 550. When the image data is found, the image is overwritten with a bit mask 555. The steps of finding image data and overwriting the image with a bit map are repeated until all images stored in memory are found and overwritten 560. In an alternative preferred embodiment, the image data stored in a temporary memory is overwritten with a bit mask when each operation that created the image is complete. For example, a viewing operation may result in image data being stored in a first temporary memory. After viewing is concluded, the image data stored in the first memory is automatically overwritten with a bit mask.

The present invention may be adopted for many purposes and may have many variations. For example, the present invention may be adopted for use with any digital document processor including a photocopier, a printer, a document scanner, a facsimile machine, a computer, a personal digital assistant, a cellular telephone, or a digital camera. The operation that triggers the automatic overwrite may be printing, copying, scanning, deleting, storing, modifying, transmitting, reading, writing, viewing, or any other type of operation implemented by a digital document processor. The overwrite function may overwrite memory with a variety of bit masks, for example, a pseudo-randomly generated bit mask, a randomly generated bit mask, a predetermined bit mask, a sequence of binary ones, a sequence of binary zeros, a predetermined sequence of binary numbers, information bits with a positive polarity, or information bits with a negative polarity. In addition, the overwrite function may consist of overwriting memory multiple times with one or more different bit masks. The overwriting scheme selected may be optimized for specific types of storage technology. For example, overwriting schemes may include: (1) a single write with a random or pseudo-random bit mask; (2) multiple writes with random or pseudo-random bit masks; or (3) multiple writes with a combination of predetermined, predictable bit masks (such as all ones, all zeros, checkerboard, etc.) and unpredictable (such as random and pseudo-random) bit masks.

In one preferred embodiment, if an operation being conducted is interrupted (for example, by a power failure or a paper jam) the invention will automatically overwrite any stored information on the memory ("automatic interruption overwrite"). It should be noted that automatic interruption overwrite could require an additional backup power source, so that if power were interrupted, there would be enough energy available to automatically overwrite the information. Automatic interruption overwrite would prevent information from being stolen by someone's disrupting power and then pulling the memory. In an alternate preferred embodiment the operation must be completed before the invention automatically overwrites any information on the memory ("completed overwrite"). This embodiment might be chosen if a user were more concerned with losing information by computer error than by theft. It should be noted that devices may allow a user to toggle between or select between the automatic interruption overwrite feature and the completed overwrite feature. Alternately, a programmer may select the automatic interruption overwrite or completed overwrite for select or all operations, so that devices are preprogrammed with the features.

The terms and expressions that have been employed in the foregoing specification are used as terms of description, not of limitation, and are not intended to exclude equivalents of the features shown and described or portions of them. The scope of the invention is defined and limited only by the claims that follow.

We claim:

1. A copier comprising:
   a nonvolatile data storage having two or more data store locations for storing an image data file;
   means for detecting an end of at least one of the following in the copier:
      an image copying operation; and
      an image printing operation;
         associated with the image data file stored in the one or more data store locations;
   means for generating at least one bit mask; and
   means for writing, upon the detection of the end of at least one of the operations, at least a portion of a generated bit mask to the two or more data store locations associated with the image data file, and thereby rendering irrecoverable the nonvolatile data at the two or more locations associated with the image data file.

2. The copier of claim 1 wherein the means for generating at least one bit mask is a means for generating at least one pseudorandom bit mask.

3. A copier comprising:
   a nonvolatile data storage having one or more data store locations for storing one or more an image data;
   means for detecting an interruption in the copier wherein a detected interruption is associated with one or more image data stored in the one or more data store locations;
   means for generating at least one bit mask; and
   means for writing, upon the detection of interruption, at least a portion of the at least one generated bit mask to the one or more data store locations associated with the one or more stored image data, and thereby rendering irrecoverable the nonvolatile data at the one or more locations associated with the image data file.

4. The copier of claim 3 wherein the means for generating at least one bit mask is a means for generating at least one pseudorandom bit mask.

5. The copier of claim 3 wherein the detected interruption is at least one of: a power failure and a paper jam.

6. A method of bit masking image data on a nonvolatile data storage associated with a multi-function device, the image data received from a transmitting device having a nonvolatile data storage comprising the image data, the method comprising the steps of:

testing for at least one of the following in the multi-function device:
an image copying operation;
an image printing operation; and
an image transmitting operation for transmitting image data to a receiving device having a memory store; associated with an image data file from at least one memory location on the nonvolatile data storage; and if an end of at least one of the tested operations is detected:
generating a bit mask; and
writing at least a portion of the generated bit mask to at least one memory location associated with the image data file and writing at least a portion of the generated bit mask to at least one of: a memory store of the receiving device, and a memory store of the transmitting device, and thereby
rendering irrecoverable the nonvolatile data at the memory store, associated with the image data file of the receiving device, and rendering irrecoverable the nonvolatile data at the memory store associated with the image data file of the transmitting device.

7. The method of claim 6 wherein the step of generating a bit mask is the step of generating a pseudorandom bit mask.

8. The method of claim 6 wherein the testing in the multi-function device comprises at least the image transmitting operation and the image transmitting operation is a facsimile transmitting operation.

9. A method of bit masking image data on a nonvolatile data storage associated with a multi-function device, the method comprising the steps of:
testing for at least one of the following in the multi-function device:
an image copying operation;
an image printing operation; and
an image transmitting operation;
associated with an image data file from at least one memory location on the nonvolatile data storage; and if an end of at least one of the tested operations is detected:
generating at least one bit mask; and
for two or more bit masking operations:
writing at least a portion of the at least one generated bit mask to at least two memory locations associated with the image data file, and thereby
rendering irrecoverable the nonvolatile data at the two or more locations associated with the image data file.

10. The method of claim 9 wherein the step of generating at least one bit mask is the step of generating a pseudorandom bit mask.

11. The method of claim 9 wherein the testing in the multi-function device comprises at least the image transmitting operation and the image transmitting operation is a facsimile transmitting operation.

12. A multi-function device adapted to execute at least one of the following operations—an image copying operation, an image printing operation, and an image transmitting operation, the device comprising:
a nonvolatile data storage having two or more data store locations comprising temporary memory and backup memory for storing an image data file;
means for detecting at least one of the following in the multi-function device:
the image copying operation;
the image printing operation; and
the image transmitting operation;
associated with an image data file stored in the one or more data store locations;
means for generating at least one bit mask; and
means for writing, upon the detection of at least one of the operations, at least a portion of the at least one generated bit mask to the two or more data store locations associated with the image data file, and thereby rendering irrecoverable the nonvolatile data at the two or more locations associated with the image data file.

13. The device of claim 12 wherein the means for generating at least one bit mask is a means for generating at least one pseudorandom bit mask.

14. The device of claim 12 wherein the means for generating at least one bit mask is a means for generating at least two pseudorandom bit masks.

15. The device of claim 12 wherein the testing in the multi-function device comprises at least the image transmitting operation and the image transmitting operation is a facsimile transmitting operation.

16. A method of bit masking image data on a nonvolatile data storage associated with a multi-function device, the image data received from a transmitting device having a nonvolatile data storage comprising the image data, the method comprising the steps of:
testing for at least one of the following in the multi-function device:
an image scanning operation interruption;
an image copying operation interruption;
an image printing operation interruption;
an image transmitting operation interruption; and
associated with an image data file from one or more locations on the nonvolatile data storage;
writing at least a portion of the generated bit mask to a memory store of the transmitting device; and
if at least one of the tested interruptions is detected:
generating a bit mask; and
writing at least a portion of the generated bit mask to the one or more memory locations on the nonvolatile data associated with the image data file, and thereby
rendering irrecoverable the nonvolatile data at the two or more locations associated with the image data file.

17. The method of claim 16 wherein the step of generating a bit mask is a step of generating a pseudorandom bit mask.

18. The method of claim 16 wherein the testing in the multi-function device comprises at least the image transmitting operation and the image transmitting operation is a facsimile transmitting operation.

19. A method of bit masking image data on a nonvolatile data storage associated with a multi-function device, the method comprising the steps of:
testing for an interruption in the multi-function device wherein a detected interruption is associated with an image data file from one or more locations on the nonvolatile data storage; and
if the interruption is detected:
generating at least one bit mask; and
for two or more bit masking operations:
writing at least a portion of the at least one generated bit mask to the two or more memory locations associated with the image data file, and thereby
rendering irrecoverable the nonvolatile data at the two or more locations associated with the image data file.

20. The method of claim 19 wherein the step of generating at least one bit mask is a step of generating a pseudorandom bit mask.

21. The method of claim 19 wherein the testing in the multi-function device comprises at least the image transmitting operation and the image transmitting operation is a facsimile transmitting operation.

22. The method of claim 19 wherein the detected interruption is at least one of: a power failure and a paper jam.

23. A multi-function device adapted to execute at least one of the following operations—an image scanning operation, an image copying operation, an image printing operation, and an image transmitting operation, the device comprising:
 a nonvolatile data storage having one or more data store locations for storing an image data file;
 means for detecting an interruption in the multi-function device wherein a detected interruption is associated with an image data stored in the one or more data store locations;
 means for generating at least one bit mask; and
 means for writing, upon the detection of interruption, at least a portion of the at least one generated bit mask to the one or more data store locations associated with the image data file, and thereby rendering irrecoverable the nonvolatile data at the two or more locations associated with the image data file.

24. The device of claim 23 wherein the means for generating at least one bit mask is a means for generating at least one pseudorandom bit mask.

25. The device of claim 23 wherein the testing in the multi-function device comprises at least the image transmitting operation and the image transmitting operation is a facsimile transmitting operation.

26. The device of claim 23 wherein the detected interrupted is at least one of: a power failure and a paper jam.

* * * * *